Sept. 14, 1954  C. W. KIZER ET AL  2,689,055
BALE BUNCHER
Filed April 23, 1951  2 Sheets-Sheet 1
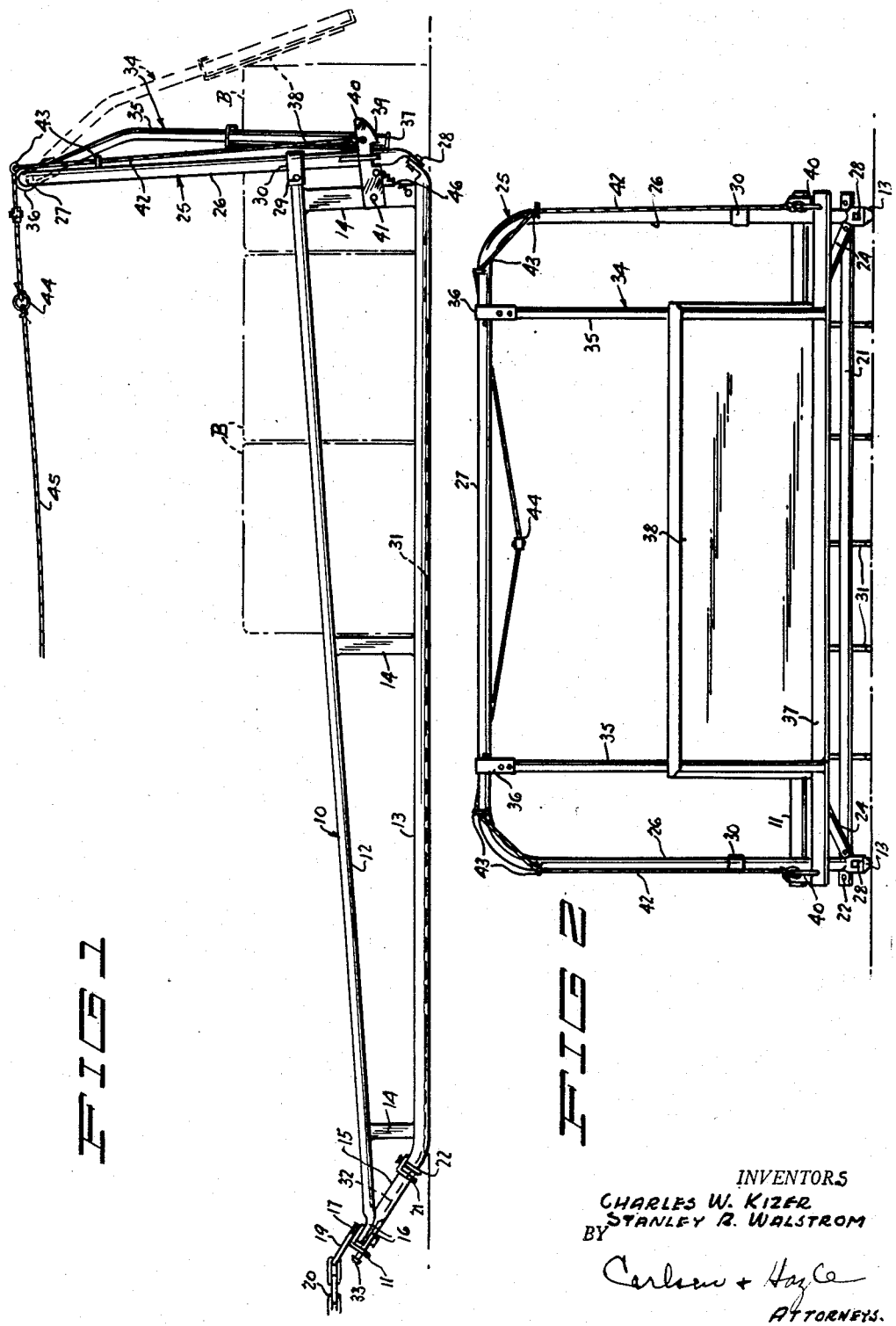
INVENTORS
CHARLES W. KIZER
STANLEY R. WALSTROM
BY
Carlsen + Hayes
ATTORNEYS.

Sept. 14, 1954     C. W. KIZER ET AL     2,689,055
BALE BUNCHER
Filed April 23, 1951     2 Sheets-Sheet 2
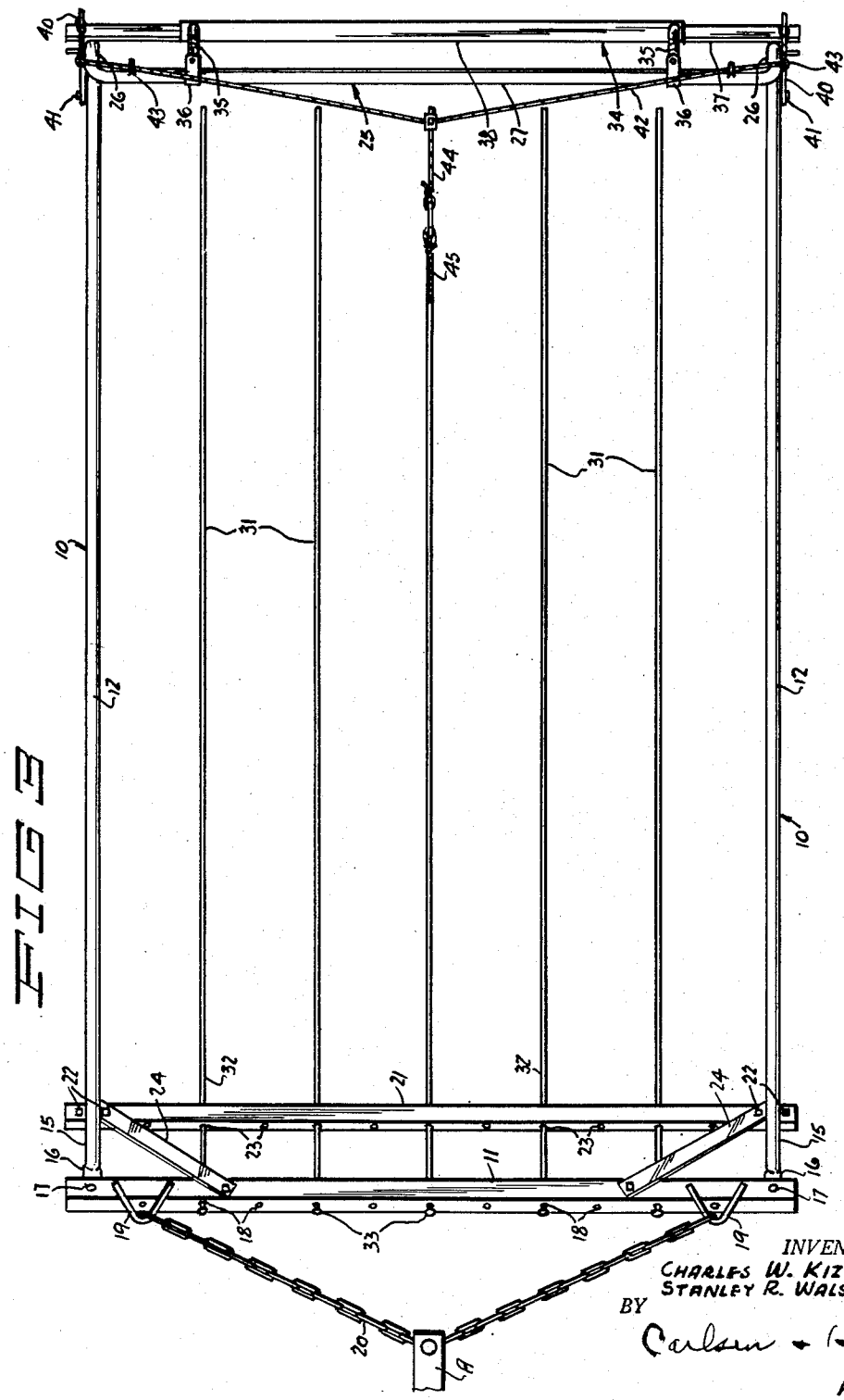
INVENTORS
CHARLES W. KIZER
STANLEY R. WALSTROM
BY
ATTORNEYS Patented Sept. 14, 1954

2,689,055

UNITED STATES PATENT OFFICE 2,689,055

BALE BUNCHER

Charles W. Kizer, Hopkins, and Stanley R. Walstrom, Minneapolis, Minn., assignors to Superior Separator Company, Hopkins, Minn., a corporation of Delaware Application April 23, 1951, Serial No. 222,465

5 Claims. (Cl. 56—474)

1

This invention relates to improvements in sleds for gathering crop materials and designed to be towed along by agricultural equipment, the sled being particularly useful in conjunction with a pick-up hay baler to collect the bales as they are formed and ejected by the baler. At present these bales fall to the ground from the machine and are scattered about over the field making it difficult to pick them up, either for stacking in the field or for transport in a truck to some other point of disposal.

As a primary object of our invention we provide a sled which is connected to the baler and has a plurality of runners upon which the bales will fall as they are ejected from the baler, so that a number of the bales may be collected or bunched and then discharged at one point, thus making the subsequent operation of picking up and loading the bales much easier. Further in accordance with this object of our invention, we provide a gate which is controlled by the operator of the baler and which regulates the dumping of the bales from the sled onto the field, it being thus possible for the baler operator either to windrow the bales or to deposit them in groups in strategic locations over the field.

Another object of our invention is to provide a bale buncher or hay sled wherein the bales are deposited upon flexible and loosely mounted carrier runners, or drag rods, so that the bales are in wiping contact with the field surface and thus they are continuously urged rearward as the sled goes forwardly. The flexibility of these runners enables them to adapt themselves to irregularities in the field surface and the mounting facilitates their removal and replacement when worn.

Another object of our invention is to provide an improved gate structure for a bale buncher of this character wherein the portion of the gate engaged by the rearmost bale upon the sled is so inclined, with respect to the vertical, that a back draft is created such as to tend to normally force the rear end of the sled downward and thus to prevent it from kicking up in traveling over irregular surfaces, and furthermore to provide a gate structure in which the pivot on which the gate swings is located forwardly of the center of gravity of the gate so that it will close positively without the use of return springs, even when working on side hills.

A further object of our invention is to provide improvements in devices of this general type which facilitate the manufacture and use thereof, and while we herein refer to the sled as primarily designed for the collection and periodic dumping

2 of baled hay, it may also find other uses in collecting crop material such as, for example, gathering the straw which issues from a combine as it moves forwardly over the field.

These and other more detailed and specific objects will be disclosed in the course of the following specification, reference being had to the accompanying drawings, in which—

Fig. 1 is a side elevation of the hay sled according to our invention and showing in dotted lines a number of bales of hay with the gate in a partially open position in the process of dumping these bales from the sled.

Fig. 2 is a rear end view of the sled.

Fig. 3 is a plan view of the sled.

Referring now more particularly and by reference characters to the drawing, the bale buncher or hay sled, according to our invention, comprises a frame made up of outside or side runners, designated generally at 10, which are disposed in transversely spaced parallel positions and connected at their forward ends by a front cross member 11. These side runners 10 comprise upper and lower longitudinal members 12 and 13, which may be conveniently fabricated from tubular material, and are rigidly secured together in superimposed, forwardly converging positions by means of upright tie bars 14. The forward ends of the lower members 13 are turned upward at 15 and the extremities of both upper and lower members are flattened at 16 and bolted or otherwise secured at 17 to the cross member 11. Preferably this cross member 11 takes the form of an angle iron, one flange of which is secured to the flattened end 16 with the other flange angling in a downward and forward direction and provided with a plurality of apertures 18, the purpose of which will presently appear. While any type of towing connection may be made to the sled, we have herein illustrated yokes 19 which are secured to the upper flange of the cross member 10 and connected by a draft chain 20 which is in turn, at its center, fastened to a part A of the hay baler or other towing device. Just forward of the point where the lower members 13 turn upward, they are also connected by another cross member 21, secured by means of U-bolts 22 to the side runners, and also consisting of an angle iron, one flange of which is turned downward and forward and provided with apertures 23 in alignment with the aforesaid apertures 18. Diagonal brace bars 24 are secured between the cross members 11 and 21 at the forward corners of the frame to hold the side runners parallel.

The rear ends of the runners 10 are also connected by the cross member, designated generally at 25, which is arched and comprises side portions 26 which are joined by a horizontal cross portion or member 27. The lower ends of the side members 26 are flattened and bolted to the similarly flattened rear extremities of the lower runner portions 13, as designated at 28, while the upper members 12 are bolted at 29 to fittings 30 encircling the side members 26, thus rigidly mounting this arched cross member with the side portions 26 angling slightly forward in the upward direction. The cross member 27 is sufficiently elevated to permit conventional bales B of hay to pass out beneath, as illustrated in Fig. 1, and it will be noted that there is no cross connection at the lower rear portion of the frame such as would interfere with the rearward movement of the bales off the sled.

The bales are carried along between the side runners 10, in wiping contact with the field surface, upon inside or carrier runners which take the form of drag rods 31, forward ends of which are slidably mounted through the aligned apertures 18—23. These drag rods are, of course, turned upwardly at their forward ends 32 and their extremities forward of the cross member 11 are offset to form heads 33 so that the rods cannot escape rearwardly, as will be understood. This mounting of the drag rods 31 permits them to be removed for replacement simply by pulling them outward in the forward direction, and spacing of the apertures 18—23 is such that larger or smaller numbers of the drag rods may be employed according to the nature of the crop material being handled, as well as to the nature of the field over which the sled is used. There must be sufficent frictional contact between the crop material and the field surface to wipe or drag the crop material rearwardly and the open work formation at the bottom of the sled, afforded by these parallel trailing drag rods, obviously permits such contact. The mounting of the rods is further such that they have considerable flexibility at their rear ends to accommodate themselves to irregularities in the field surface, and the length of the rods is such that they terminate well forward of the rear end of the sled, as well as forward of the gate, next to be described, so that no interference is had with this flexing action of the rods.

A gate, designated generally at 34, is swingably suspended in the space formed by the arched shape of the rear cross member 25, and as here shown the gate comprises tubular uprights 35, the upper ends of which are attached to straps 36, pivotally mounted around the elevated cross members 27, as best shown in Fig. 2. The lower ends of these uprights 35 are secured to a lower cross bar 37 and immediately above this cross bar is a plate 38 which connects the uprights 35 and is so located as to be engaged by the rearmost bale B upon the sled. The lower cross bar 37 extends at its opposite ends out beyond the side members 26 to act as a stop for the forward swinging motion of the gate and these projecting ends of the cross bar are normally engaged by hooks 39 upon latches 40, pivoted at 41 upon the rearmost tie bar 14. Thus these latches normally will prevent upward swinging motion of the gate, but cables 42 are attached to the rear ends of the latches and run upward and forward through eyes 43 upon the rear cross member 25 to a bridle connection at 44 with a forwardly extending trip rope 45. This trip rope runs forward to a position convenient for operation by the baler operator and a pull upon the rope will lift the latches 40 to free the gate 34 so that it may swing upward and rearward, due to the rearward pressure of the bales B, to permit these bales to escape. The latches 40 are normally urged downwardly by return springs 46 and are conventionally shaped to allow the gate to relatch itself as it swings downward and forward, following clearance of the last bale from the sled.

It is thought that the operation of the sled will be obvious from the foregoing and the use of the sled will permit the baler operator to gather any number of bales for dumping them on the field in a bunch, or in windrows, to facilitate the subsequent loading or stacking of the bales. Of particular importance is the shape of the gate 34 as viewed from the side, and it will be noted that the lower portion of the gate, where it is rearwardly engaged by the bales, angles downwardly and forwardly from the vertical. As a result, the bale pressure creates a back draft with a downward component of force which we find sufficient to hold the rear end of the sled downward even when traveling over exceedingly rough terrain. Without this back draft there would be a pronounced tendency of the sled under some conditions to kick upward even to the point where the bales might accidentally escape, and without this downward pressure it would be necessary to employ a cross connection at the rear between the main frame and the drag rods 31. Furthermore, the shape of the gate is such that above this forwardly and downwardly angled portion the gate angles upward and forward to the point where it is swingably suspended from the cross member 27 with the result that this pivot axis is located forward of the center of gravity of the gate, causing it to close positively of its own weight, even in side hill work. The necessity for return springs for the gate is thus eliminated.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a sled for baled hay, the combination comprising a frame having side runners and a front cross member connecting the forward end of the runners, an arched cross member connecting the rear ends of the runners and forming a space beneath through which the bales may move rearwardly from between the runners, carrier means arranged in trailing positions between the side runners for dragging the bales along, means for connecting the frame to a traveling hay baler to receive the bales therefrom, a gate swingably suspended from the arched rear cross member to hold the bales against rearward displacement off the carrier means, latch means for holding the gate closed, and the portion of the gate rearwardly engaged by the rearmost bale on the carrier means being angled downward and forward from the vertical whereby the pressure of the bale will tend to hold down the rear end of the frame.

2. A baled hay sled of the character described, comprising in combination, a frame having spaced side runners and a cross member connecting the front ends of the runners, means for attaching the frame to a traveling hay baler to receive bales between the runners, means between the runners for carrying the bales along in wiping contact with the field surface, an arched rear member connecting the rear ends of the runners and having upright side portions and an elevated cross member beneath which the bales will pass out rearwardly, a gate swingably suspended from the elevated cross member to hold the bales, latch means for the gate, and the gate having a lower portion angled forward and downward for engagement by the rearmost bale whereby the rearward bale pressure will tend to hold down the rear end of the frame.

3. A baled hay sled of the character described, comprising in combination, a frame having spaced side runners and means connecting the front ends of the runners, means for attaching the frame to a traveling hay baler to receive bales between the runners, means between the runners for carrying the bales along in wiping contact with the field surface, an arched rear member connecting the rear ends of the runners and having upright side portions and an elevated cross member beneath which the bales will pass out rearwardly, a gate pivoted to and suspended from the said elevated cross member to swing upward and rearward from a normal closed position, latches for releasably holding the gate in its closed position, and the gate pivot axis being located forwardly with respect to the center of gravity of the gate whereby the gate will positively return to closed position of its own weight.

4. A baled hay sled of the character described, comprising in combination, a frame having spaced side runners and a cross member connecting the front ends of the runners, means for attaching the frame to a traveling hay baler to receive bales between the runners, forwardly connected trailing runner means between the side runners for carrying the bales along in wiping contact with the field surface, an arched rear member connecting the rear ends of the side runners and comprising side portions and an elevated horizontal cross member beneath which the bales may move off the rear end of the sled, a gate having pivotal connections to and swingably suspended at its upper edge from the said elevated cross member, latch means for holding the gate in position to retain the bales on the sled, the lower portion of the gate where engaged by the rearmost bale being inclined downwardly and forwardly whereby the pressure of the bales will tend to hold down the rear end of the frame, and the upper portion of the gate angling upward and forward to said elevated cross member, the pivot connections of the gate being forward of its center of gravity causing the gate to close positively of its own weight on both level and irregular terrain.

5. A baled hay sled of the character described, comprising in combination, a frame having spaced side runners and means connecting the front ends of the runners, means for attaching the frame to a traveling hay baler to receive bales between the runners, means between the runners for dragging the bales along in wiping contact with the field surface, an arched rear member connecting the rear ends of the runners and having side members and a connecting elevated cross member, a gate swingably suspended from said elevated cross member to hold the bales in place, the said gate comprising uprights pivoted at upper ends to the elevated cross member and a cross bar connecting the lower ends of the uprights and extending outwardly at its ends to rest forwardly against the side members, a plate connecting the uprights to hold the bales in place, latches on the rear ends of the side runners and normally engaging the cross bar to hold the gate closed, the gate uprights having lower portions angling downwardly and forwardly and upper portions angling upwardly and forwardly, and flexible means connected to the latches and extending forward to the baler for controlling the gate.

UNITED STATES PATENTS

References Cited in the file of this patent

| Number | Name | Date |
|---|---|---|
| 99,766 | Eddleman | Feb. 15, 1870 |
| 115,783 | Strean | June 6, 1871 |
| 153,862 | Strean | Aug. 4, 1874 |
| 161,637 | Reed | Apr. 6, 1875 |
| 1,292,204 | Wood | Jan. 21, 1919 |
| 1,883,473 | Barrett | Oct. 18, 1932 |
| 2,027,128 | Tessmer | Jan. 7, 1936 |
| 2,221,719 | Peterson | Nov. 12, 1940 |
| 2,649,982 | Ray | Aug. 25, 1953 |